United States Patent [19]

Tol et al.

[11] Patent Number: 4,959,845
[45] Date of Patent: Sep. 25, 1990

[54] RECEIVER OF A SYSTEM FOR TRANSMITTING DATA SYMBOLS AT A GIVEN BAUD-RATE

[75] Inventors: Simon J. M. Tol, Hilversum; Kornelis J. Wouda, Nuenen, both of Netherlands

[73] Assignee: AT&T Bell Laboratories, Murray Hill, N.J.

[21] Appl. No.: 308,707

[22] Filed: Feb. 9, 1989

[30] Foreign Application Priority Data

Feb. 26, 1988 [NL] Netherlands ............. 8800490

[51] Int. Cl.$^5$ ............................................. H04L 7/027
[52] U.S. Cl. ..................................... 375/106; 375/108
[58] Field of Search ................... 375/94, 95, 119, 120, 375/118, 106, 101, 108

[56] References Cited

U.S. PATENT DOCUMENTS 3,761,818  9/1973  Tazaki et al. ................. 375/95
4,376,309  3/1983  Fenderson et al. ............ 375/101

Primary Examiner—Douglas W. Olms
Assistant Examiner—Marianne Huseman
Attorney, Agent, or Firm—Lucien C. Canepa

[57] ABSTRACT

A receiver of a system for transmitting data symbols at a given baud-rate comprises a symbol detector (7) operating at the baud-rate 1/T and means (6) for optimally conditioning received data symbols for this symbol detection. From the received conditioned data signal [s(k)], a phase error signal [E(K−1).ĉ(K)] is derived that is representative of a phase difference between a locally generated baud-rate clock signal and a baud-rate clock signal inherent to the received data symbols, and the receiver comprises means (11, 12) for the reduction of this phase difference step-by-step in response to the phase error signal [e(k−1).ĉ(k)]. This receiver further includes an accumulator (44) for determining the mean value [u(k)] of the phase error signal over a predetermined number (M) of symbol intervals and a detector (45) for establishing whether this means value [u(k)] is situated in a zone whose boundaries $]\pm\gamma r(k)/N$ are determined by a given fraction (1/N, N>1) of the level [$V_r$(k)] of the conditioned signal [s(k)]. If the mean value [u(k)] of the phase error signal is situated in this zone, the process of shifting the phase of the local clock signal step-by-step is stopped.

10 Claims, 3 Drawing Sheets

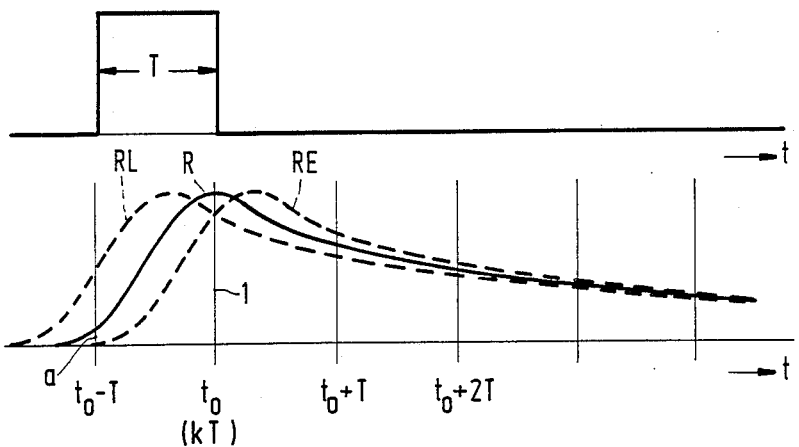
FIG. 1A
FIG. 1B
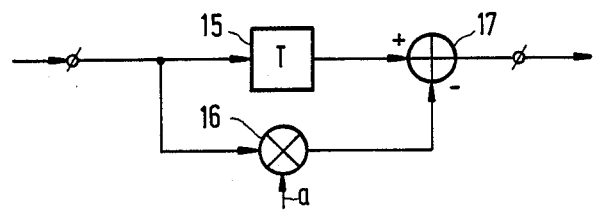
FIG. 1C
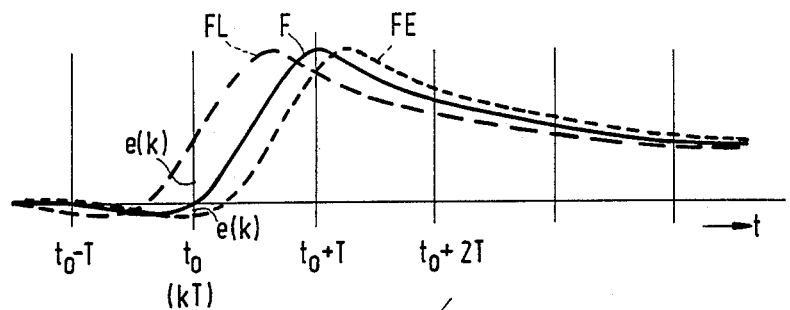
FIG. 1D
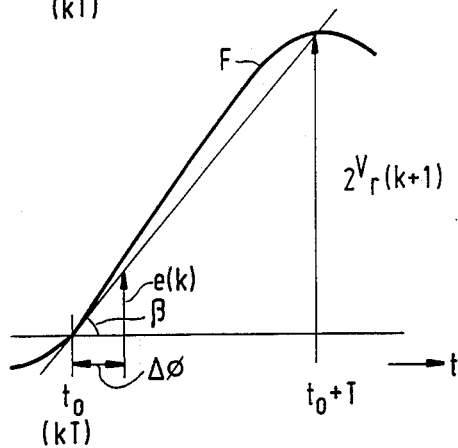
FIG. 1E

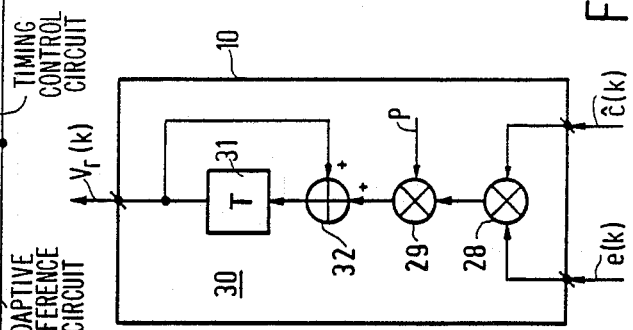
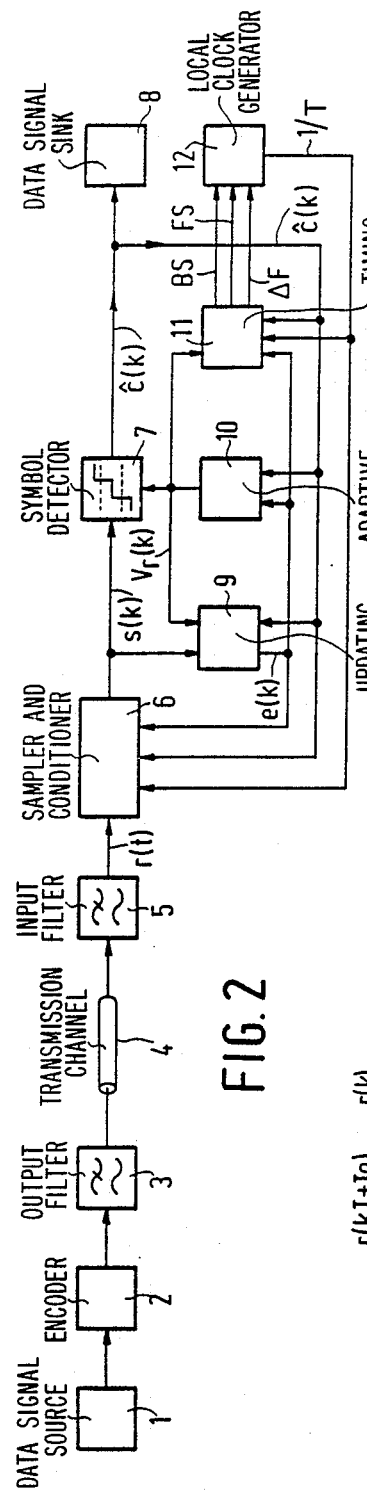
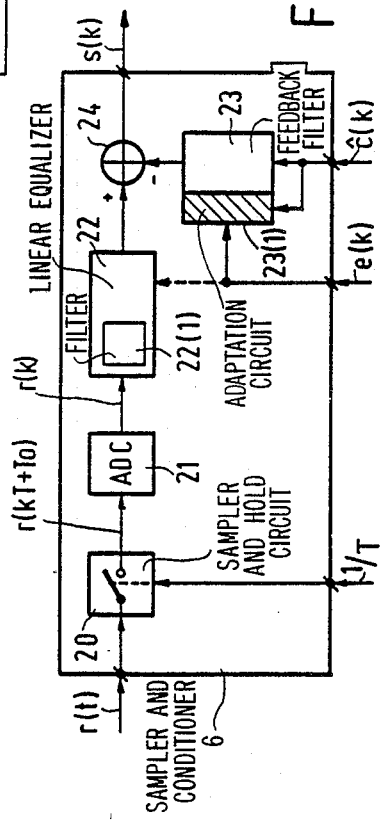
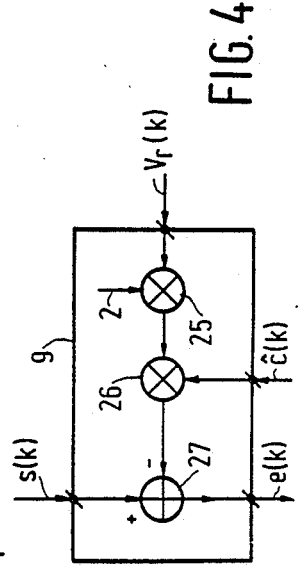

RECEIVER OF A SYSTEM FOR TRANSMITTING DATA SYMBOLS AT A GIVEN BAUD-RATE

BACKGROUND OF THE INVENTION

The invention relates to a receiver of a system for transmitting data symbols at a given baud-rate 1/T, this receiver comprising a symbol detector operating at the baud-rate 1/T; means for optimally conditioning the received data symbols for symbol detection; means for deriving from the conditioned signal an error signal which is representative of a phase difference between a baud-rate clock signal associated with the received data symbols and a locally generated baudrate clock signal for the symbol detector; and phase control means for reducing this phase difference step-by-step in response to the error signal.

A data transmission system with such a receiver is known from the U.S. Pat. No. 4,494,242. In the known receiver the received data symbols are sampled at the baud-rate. As indicated in this patent, such a sampling is advantageous among other things in that the required equipment can be considerably more simple than when sampling at the higher Nyquist rate.

When sampling in the receiver of a data transmission system it is essential that the clock signals used in the receiver for the sampling be always in phase with the clock signals which are associated with the transmitted and received signal. For combating the unavoidable phase differences between these clock signals, the clock signal in the receiver must be continuously adjusted.

The phase adjustment in the known receiver is based on the empirical fact that the shape and size of the precursor of a received data symbol substantially only depend on filters in the transmitter and receiver and are practically independent of the properties of the transmission line between transmitter and receiver and thus possess for a specific transmission system a variation which is known in advance. Now, by comparing a fraction of the instantaneous value of the received signal to the precursor portion of that signal at the previous sampling instant, information can be derived about the phase shift between the detection instant proper and the desired detection instant, which information in the known arrangement is used for adjusting the phase.

In order to avoid errors in the symbol detection, it is desired that the phase can be adjusted accurately. The latter requires a phase control by phase steps having a sufficiently small size and thereto a high internal clock rate should be used in the receiver.

The requirements which are made on the accuracy of the phase control are even stricter if full-duplex data transmission through a single wire pair is concerned In full-duplex data transmission, as is well known, a compensation signal is used which is obtained by means of echo cancellation (EC) either in combination or not in combination with decision feedback equalization (DFE). In this case, a relatively small phase step may already lead to a considerable adjustment of the adaptive arrangements supplying this compensation signal, which adjustment may take several hundreds of symbol intervals, so that the probability of errors in the symbol detection is increased considerably. This is especially a problem if, in response to the phase control, the phase keeps fluctuating in small steps around the optimum final value and if such a small step causes a change of the respective coefficient values in the echo canceller (EC) and the decision feedback equalizer (DFE).

By the choice of a sufficiently high clock rate resulting in the possibility to make small phase steps, this problem can be overcome. However, to this end use must be made of a relatively costly clock signal regenerator. Moreover, too high chock rates are undesired in view of the maximum processing rate of digital components in the receiver, whilst also inadmissibly high power dissipation may occur at these high rates.

In the article "A long reach digital subscriber loop transceiver, by P. F. Adams et al., in British Telecommunication Technology Journal, Vol. 5, No. 1, Jan. 1987, pp 25–31, a different solution is described, in which an echo canceller is used comprising means for estimating the required deviation of the echo compensation signal in the case of a phase step. Also according to this article, the phase deviation is estimated while using the fact that the precursor value is substantially independent of the transmission line. The value of the precursor, however, is estimated by reducing the value of the signal sample close to the peak of the received data symbol by a constant number of times the value of the signal sample which was determined T seconds earlier. Such an echo canceller too is intricate and expensive and, consequently, preferably not used.

SUMMARY OF THE INVENTION

The invention has for its object to provide a receiver of the type mentioned in the opening paragraph, which receiver offers a simple and inexpensive solution to the problem of the phase control of the clock signal as depicted above.

Thereto, the receiver according to the invention is characterized in that the receiver comprises means for establishing whether the mean error signal value, over a predetermined number of symbol intervals, is situated in a zone whose boundaries are determined by a first given fraction of the level of the conditioned signal at the symbol detection instant, and means for blocking the phase control means if the said mean error signal value is situated in the said zone, and also for unblocking the phase control means if the mean error signal value in the blocked state meets a predetermined criterion.

The invention is based on the recognition that it is undesirable to continue adjusting the phase of the local clock signal around the optimum detection instant, once a predetermined accuracy has been achieved. This especially applies when use is made of echo cancellation (EC) either in combination or not in combination with decision feedback equalization (DFE). Therefore, according to the invention, it is first established whether the phase is situated inside a predetermined narrow zone around the optimum phase and if this is the case, further phase steps around the optimum are blocked.

According to a preferred embodiment of the invention, when the phase control means are blocked, the mean value of the error signal is thereafter determined by averageing the error signal over a larger number of symbol intervals. The chance of phase steps as a result of occasional disturbances of the error signal, caused by noise, for example, is thus reduced.

According to a further preferred embodiment of the invention, the boundaries of the zone of permissible mean values of the error signal are enlarged when the phase control means are blocked. This reduces the chance of the mean error signal occurring outside this enlarged zone and hence also the chance that adjustments have to be made as yet. In this way too the influence of noise in the error signal can be suppressed in this preferred embodiment the phase control means are unblocked when the criterion is met that the mean error signal is situated outside this enlarged zone preferably, in the situation in which the zone of permissible mean values of the error signal is enlarged, the averageing is effected over a larger number of symbol intervals so as to attain an optimum suppression of disturbing signals in the error signal. For determining the extent of phase convergence, that is to say, the extent to which the phase of the local clock signal approaches the optimum, the value of the precursor of the received data symbol is utilized, and it is established whether this precursor meets predetermined criteria. The great advantage of the arrangement according to the invention is the fact that a clock signal generator having a relatively low frequency will suffice, which is cost-effective and avoids the problems inherent in high frequencies in addition, in data transmission systems with echo cancellation (EC) either in combination or not in combination with decision feedback equalization (DFE), a disturbance of the coefficients in the respective adaptive EC and DFE arrangements due to phase fluctuations around the optimum is avoided.

BRIEF DESCRIPTION OF THE DRAWING

The invention will hereinafter be further explained on the basis of an embodiment with reference to the drawing, in which:

FIGS. 1A–1E: show a number of time diagrams and a block diagram for illustrating the way in which information about the relative phase of a local baud-rate clock signal can be derived from received data symbols:

FIG. 2: shows a general block diagram for a data transmission system with a receiver according to the invention;

FIG. 3: shows a block diagram of the means in the receiver of FIG. 2 for optimally conditioning received data symbols for symbol detection;

FIG. 4: shows in detail a block diagram of the updating circuit in the receiver of FIG. 2;

FIG. 5: shows in detail a block diagram of the adaptive reference circuit in the receiver of FIG. 2;

DETAILED DESCRIPTION

Figure 6:
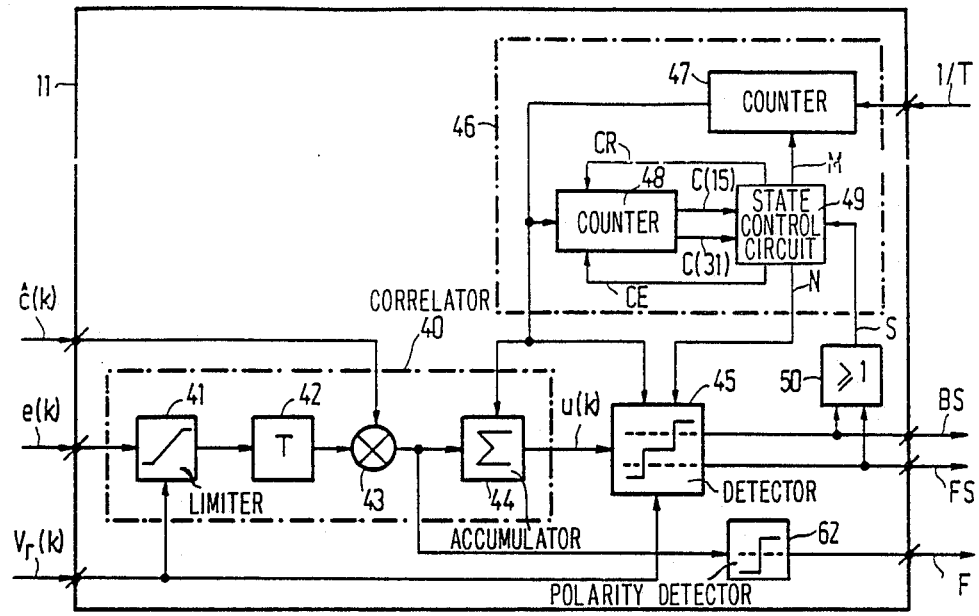
FIG. 6: shows a block diagram of the timing control circuit in the receiver of FIG. 2.

In the following description data symbols are assumed to be transmitted according to a standardized bipolar line code for suppressing DC current components, the data symbols assuming the values. The way in which information about the relative phase of a local baud-rate clock signal for sampling the received data symbols can be derived from these received data symbols will now be explained with reference to FIG. 1.

FIG. 1A shows the pulse shape of a single data symbol with a value $+1$ which in the transmitter of a data transmission system is applied to the input of the output filter of the transmitter. At a baud-rate $1/T$ of the data symbols the duration of this data symbol is T seconds. After transmission through a dispersive transmission channel, for example a wire pair in the local public telephone network, a data symbol occurs in the receiver of the data transmission system at the output of the input filter, of which data symbol a possible pulse shape is represented in a stylized form by the solid line R in FIG. 1B. In the receiver the received data symbol is sampled by means of a local clock signal having baud-rate $1/T$ at times which are denoted $t_O-T$, $t_O$, $t_O+T$, $t_O+-2T$, ... in FIG. 1B. In FIG. 1B it is assumed that this local clock signal has the correct phase for sampling the data symbol with the pulse shape R, the sampling taking place at instant $t_O$ near the peak of this pulse shape R with a normalized peak value $+1$. The portion of the pulse shape R for instants t preceding sampling instant $t=t_O$, so in FIG. 1B the portion on the left of instant $t=t_O$, is known as the precursor. Now, in practice it appears that the shape and the duration of this precursor are substantially independent of the properties of the transmission channel (wire pair) between transmitter and receiver, but are basically determined exclusively by the output filter of the transmitter and the input filter of the receiver. This implies that for a given combination of transmitter and receiver the shape and the duration of the precursor are known in advance, and more specifically, that the precursor of pulse shape R in FIG. 1B at the instant $t=t_o-T$ has a value a known in practice for a normalized peak value $+1$ at the point $t=t_0$.

The received data symbol having this pulse shape R can now be applied to a high-pass filter having the structure represented in FIG. 1C, In this filter the input signal is delayed over a symbol period T by means of delay element 16 and this input signal is also multiplied by a factor a by means of a multiplier 16. With the aid of a summator 17 the output signal of multiplier 16 is subtracted from the output signal of delay element 15. When the received data symbol having the pulse shape R of FIG. 1B is applied to the filter of FIG. 1C, the data symbol at the output of this filter has the pulse shape as shown in the stylized form by the solid line F in FIG. 1D. As appears from FIG. 1D, this pulse shape F reaches its peak value $+1$ at an instant $t=t_0+T$, that is to say, an instant that is shifted over a symbol period T with respect to the instant $t=t_0$ at which pulse shape R in FIG. 1B reaches its peak value $+1$. Furthermore, the precursor of this pulse shape F in FIG. 1D now has a value equal to 0 at the instant $t=t_0$.

In FIG. 1B are also shown two pulse shapes RE and RL of received data symbols that are associated with a transmitted data symbol with a value $+1$, but sampled in the receiver at too early a sampling instant (pulse shape RE, when the sampling takes place before the peak is reached) or at too late a sampling instant (pulse shape RL, when the sampling is effected after the peak has already been passed). In both cases a phase shift of the local sampling signal is desirable, because without such a correction this phase can start deviating ever more from the correct sampling phase until it can no longer be established whether the sample of these pulse shapes RE and RL represents a transmitted data symbol with a value $+1$ or a transmitted data symbol with the value 0. FIG. 1D shows how after processing by the filter of FIG. 1C the pulse shape RE results in the pulse shape FE whose precursor at the sampling instant $t=t_0$ has a negative value, and also how pulse shape RL after processing by the filter of FIG. 1C results in a pulse shape FL whose precursor at the sampling instant $t=t_0$ has a positive value. If the pulse shapes R, RE and RL in FIG. 1B relate to a received data symbol having rank number k, it may be put without a loss of generality that $t_0=kT$ with $-[<1<+\infty$. The value of the precursor of the pulse shapes F, FE and FL at the sampling instant $t=t_0$ in FIG. 1D can then be considered an error signal e(k) which has a value e(k)=0 when a sampling is effected with the correct phase, a negative value e(k)<0 when the sampling is effected early and a positive value e(k)>0 when the sampling is effected late. So, the polarity of error signal e(k) provides information about the desired direction in which the phase of the local sampling signal has to be shifted In the example shown, this is a phase shift to the left for the positive value e(k) and a phase shift to the right for a negative value e(k).

The polarity of the received data symbol naturally affects the polarity of error signal e(k). For taking account of the polarity of the data symbols, use can be made of the expression:

$$e(k)\hat{c}(k+1) \quad (1)$$

as a possible indication for the required direction of the phase shift, $\hat{c}(k+1)$ being the polarity of the data symbol at the output of the filter in FIG. 1C at the sampling instant $t=t_0+T=(k+1)T$ as it is determined by a symbol detector in the receiver that is operating at the baud-rate 1/T. If expression (1) has a positive value, in the time diagrams of FIG. 1B and FIG. 1D a shift to the left is required and if expression (1) has a negative value, a shift to the right is required.

The magnitude of error signal e(k) is a measure for the required magnitude of the phase shift. This can be explained with reference to FIG. 1E showing in greater detail the portion of pulse shape F in FIG. 1D in the neighbourhood of the precursor interval $(t_0, t_0+T)$. The pulse shape F around the sampling instant $t=t_0=kT$ is a shape that in a first approximation may be considered to be linear. Now, if the peak value of pulse shape F at sampling instant $t=t_0+T=(k+1)T$ is set at $2V_r(k+1)$, that is to say, equal to twice an adaptive reference signal $V_r(k+1)$ which will be further explained in the description following hereinafter, and pulse shape F is approximated by a straight line through the points having value 0 at sampling instant $t=t_0=kT$ and value $2V_r(k+1)$ at sampling instant $t=t_0+T=(k+1)T$, the following holds for the slope $\tan(\beta)$ of this straight line as an approximation of pulse shape F around the sampling instant $t=t_0$ in FIG. 1E:

$$\tan(\beta)=2V_r(k+1)/T. \quad (2)$$

If it is assumed that in the receiver the phase of the local sampling signal can assume a number of m discrete values in one period T, for the magnitude of a single phase step $\Delta\phi$ expressed as a fraction of the period T, it holds that:

$$\Delta\phi=T/m. \quad (3)$$

Then, from FIG. 1E it follows that for an error signal e(k) corresponding with a single phase step $\Delta\phi$ to the right from $t=t_0=kT$ it holds in good approximation that:

$$\tan(\beta)=2V_r(k+1)/T=e(k)/\Delta\phi \quad (4)$$

and thus, when utilizing formula (3):

$$e(k)=2V_r(k+1)/m \quad (5)$$

Also for an error signal e(k) corresponding with a single phase step $\Delta\phi$ to the left from $t=t_0=kT$, it holds that:

$$e(k)=-2V_r(k+1)/m \quad (6)$$

Thus, the above has shown that there is a simple and unambiguous relationship between the magnitude of a single phase step $\Delta\phi$ and the associated magnitude of error signal e(k) in the neighbourhood of the sampling instant $t=t_0=kT$, in which a linear approximation of pulse shape F is allowed.

FIG. 2 shows a general block diagram of a data transmission system with a receiver according to the invention for optimizing the phase of the local baud-rate sampling signal. The transmitter of this system comprises a data signal source 1 for generating binary data symbols which are converted in an encoder 2 into ternary data symbols according to a standardized bipolar line code at a symbol rate 1/T. The data symbols at the output of encoder 2 are applied through an output filter 3 to a transmission channel 4 which is formed, for example, by a wire pair of the local public telephone network. The receiver of this system comprises an input filter 5 connected to the transmission channel and the received data symbols are applied to means 6 connected to this filter 5 for sampling these data symbols at a rate of 1/T and conditioning the obtained samples for optimum detection in a symbol detector 7. The detected data symbols are finally applied to a data signal sink 8, in which a replica of the original binary data symbols of source 1 can be obtained while utilizing a decoder that corresponds with the bipolar encoder 2 in the transmitter.

For making the sampling and conditioning means 6 and the symbol detector 7 function in the proper fashion, the receiver in FIG. 2 also contains an updating circuit 9, an adaptive reference circuit 10 and a timing control circuit 11 for a local clock generator 2 which generates a local clock signal of symbol rate 1/T with a correct phase for sampling in means 6. The structure and the functioning of these elements 6, 9-12 of the receiver in FIG. 2 will be further explained with reference to FIG. 3–FIG. 8 As the sampling is effected at a rate 1/T at the output of filter 5 in the receiver of FIG. 2, the description of the further signal processings in this receiver will be based on a conventional discrete-time model, in which the signals are denoted in the customary fashion.

FIG. 3 shows a block diagram of means 6 of the receiver of FIG. 2. In FIG. 3 an output signal r(t) of filter 5 in FIG. 2 is applied to a sample-and-hold circuit 20 and sampled therein at rate 1/T with the local clock signal originating from clock generator 12 in FIG. 2. In the foregoing it is assumed that the clock signal inherent to the received data symbols occurs at instants t=kT where is an integer with $-\infty < k < +\infty$. Generally, the local clock signal will then difference between the local clock signal and the clock signal inherent to the received data symbols and thus $T_O$ satisfies $-T/2 < T_O T/2$. At instants $t=kT+T_O$ there will occur at the output of circuit 20 in FIG. 3 samples $r(kT+T_O)$ of the analog signal r(t) which are converted with the aid of an analog-to-digital converter 1 into samples of a digital signal which in a customary fashion is denoted r(k). This signal r(k) is applied to a linear equalizer 22 that is arranged for suppressing in the best way possible precursive intersymbol interference and noise which have developed during the transmission of the data symbols. On the basis of the explanation of FIG. 1 it will be evident that this linear equalizer 22 can comprise a filter 22(1) having a structure as represented in FIG. 1C for cancelling the most important component of the precursive intersymbol interference. In FIG. 3 a feedback filter 23 is also included which forms part of an equalizer of the decision feedback type. On the basis of detected data symbols ĉ(k) at the output of symbol detector 7 in FIG. 2, this feedback filter 23 forms a cancelling signal for postcursive intersymbol interference which has developed during the transmission of the data symbols, which cancelling signal is subtracted from the output signal of the linear equalizer 22 by means of a summator 4 to obtain an input signal s(k) for symbol detector 7 in FIG. 2 which is cleared in the best way possible of precursive and postcursive intersymbol interference and noise. For providing optimum conditioning of this signal s(k) for symbol detection a feedback filter 23 is arranged adaptively and comprises an adaptation circuit 23(1) which is controlled by the error signal e(k) mentioned previously. This error signal e(k) is representative of the phase difference between the local clock signal and the clock signal inherent to the received data symbols, but this error signal e(k) is also representative of the postcursive intersymbol interference which has to be cancelled by feedback filter 23. For, with a given combination of the filters 3, 5 in the transmitter and receiver the precursive intersymbol interference is practically known and this intersymbol interference is substantially removed by filter 22(1) of the linear equalizer 22, which filter 22(1) has the structure represented in FIG. 1C. It is equally possible to arrange linear equalizer 22 adaptively and provide it with an adaptation circuit which is controlled by an error signal e(k), as symbolically shown in FIG. 3. The structure and the operation of the adaptive equalizers of the linear type as well as the decision feedback type are widely known and do not need any further explanation, because in the present receiver use can be made of entirely conventional techniques. It should be noted, however, thai it is not necessary to include filter 22(1) in linear equalizer 22 of FIG. 3, as this filter 22(1) is linear and can, basically, be inserted at any point in the transmission system between encoder 2 in the transmitter and summator 24 in means 6 of the receiver. For simplicity of the embodiment, however, this filter 22(1) should preferably be included in linear equalizer 22 of FIG. 3.

The way in which error signal e(k) is obtained, will be further explained with reference to FIG. 4 showing an optional embodiment of updating circuit 9 of FIG. 2. This circuit 9 is arranged for generating error signal e(k) in accordance with the following equation:

$$e(k)=s(k)-2V_r(k)\cdot\hat{c}(k) \qquad (7)$$

where s(k) is the input signal of symbol detector 7 in FIG. 2 and ĉ(k) is the output signal of this symbol detector 7, and where $V_r(k)$ is an adaptive reference signal which is generated by circuit 10 in FIG. 2 in a manner (7). to be explained. Circuit 9 of FIG. 4 comprises a multiplier 25 multiplying signal $V_r(k)$ by a factor of 2 and a multiplier 26 multiplying the signal $2V_r(k)$ thus obtained by signal (k) for forming a signal $ZV_r(k)$ which is subtracted from signal s(k) with the aid of a summator 27. In this way, an error signal e(k) the output occurs at of summator 27 which satisfies the equation (7).

The reference circuit 10 of FIG. 2 is arranged for generating in response to signals e(k) and ĉ(k) an adaptive reference signal $V_r(k)$ which is as good an estimate as possible of the half of the peak value of the received data symbol. This reference signal $V_r(k)$ is used in symbol detector 7 as a threshold for the symbol detection and is also used to counteract the influence of the received data symbol on error signal e(k), as appears from the above equation (7). An optional embodiment of this adaptive reference circuit 10 is shown in more detail in FIG. 5. Circuit 10 of FIG. 5 is arranged for forming a subsequent sample $V_r(k+1)$ of the reference signal in accordance with the following equation:

$$V_r(k+1)=V_r(k)+p.e(k).\hat{c}(k) \qquad (8)$$

where Vr(k) is the current sample of the reference signal and p a constant value determining the magnitude of the adaptation step (and hence also the adaptation rate).

Reference circuit 10 of FIG. 5 comprises a multiplier 28 multiplying signal e(k) by signal ĉ(k) and a multiplier 29 multiplying the product signal e(k) ĉ(k) thus obtained by adaptation constant p for forming an adaptation term p.e.(k).ĉ(k).ĉ(k) This adaptation term is applied to an accumulator 30 which is formed by a memory 31 for storing sample Vr(k) of the reference signal and an adder 32 for forming the sum of sample Vr(k) and adaptation term p e(k).ĉ(k) in accordance with the right-hand side of equation (8). This sum is stored in memory 31 to provide at the output of memory 31 after an interval T the next sample $V_r(k+1)$ of the adaptive reference signal which satisfies equation (8).

It should be observed that the manner of generating an adaptive reference signal $V_r(k)$ and an error signal e(k) described hereinbefore, is known per se from the article Adaptive Reference Echo Cancellation, by D. A. Falconer in IEEE Trans Commun., Vol. COM-30, No. 9, Sept. 1982, pp. 2083-2094, (compare FIG. 3) Furthermore, the structure of the present receiver, as explained so far with reference to FIG. 2-FIG. 5, is also outlined broadly in the article Towards a Single Chip ISDN Transmission Unit" by K. J. Wouda et al. in Proc. ISSLS 86, Tokyo 1986, pp 250-255 (compare FIG. 9 and FIG. 11).

For sampling the received data symbols the receiver of FIG. 2 utilizes the local clock signal of frequency 1/T which is generated by clock generator 12 and has a phase that generally differs from the phase of the clock signal inherent to the received data symbols in order to reduce this phase difference in a step-by-step fashion, a timing control circuit 11 is connected to clock generator 12 which receives, in addition to the output signal from clock generator 12, the respective output signals e(k), $V_r(k)$ and ĉ(k) from updating circuit 9, reference circuit 10 and symbol detector 7 for generating control signals BS and FS for shifting the phase of the local clock signal forward or backward in a step-by-step fashion. FIG. 6 shows a block diagram of this timing control circuit 11.

From the explanation of FIG. 1, and, more specifically. formula (1), it follows that the required information about the phase shift to be effected can be derived from a signal of the form e(k−1) ĉ(k). Thereto, circuit 11 of FIG. 6 comprises a correlator 40 with a limiter 41, a delay element 42 having a delay time of one sample period T, a multiplier 43 and an accumulator 44. Signal e(k) is applied through limiter 41 and delay element 42 to multiplier 43 and multiplied therein by signal ĉ(k) for forming a signal e(k−1).ĉ(k). Limiter 41 is used for restricting the value of signal e(k) to a range between, for example, −$V_r(k)$/2 and +$V_r(k)$/2, the limiting values being controlled by adaptive reference signal $V_r(k)$. For, signal e(k) contains in addition to desired components also interference and noise components which can occasionally assume very high peak values and could therefore lead to large, but undesirable and also unnecessary phase shifts. To prevent this the magnitude of signal e(k) is restricted in limiter 41 to values which do not exceed $V_r(k)$/2 Needless to observe that also different limiting values are possible, as long as it is avoided that occasional peaks in signal e(k) lead to occasional large disturbances of the signal from which the information about the phase shift is derived. Despite this restriction of signal e(k), interference and noise components in signal e(k−1).ĉ(k) can yet lead to large undesired phase shifts and to combat same this signal e(k−1).ĉ(k) is averaged over M sample periods by means of accumulator 44

The output signal of accumulator 44 is applied to a detector 45 having a positive and a negative threshold of the same magnitude which is derived from adaptive reference signal $V_r(k)$ If this output signal of accumulator 44 is higher than the positive threshold, detector 45 supplies a signal BS having the logic value "1" which effects in clock generator 12 a phase shift of the local clock signal by a step Δϕ in backward direction (thus to the left in the time diagrams of FIG. 1). Detector 45 likewise supplies a signal FS having a logic value "1" which effects in clock generator 12 a phase signal by a step Δϕ in forward direction (thus to the right in the time diagrams of FIG. 1), if this output signal of accumulator 44 is lower than the negative threshold. For output signals of accumulator 44 situated between the positive and negative thresholds of detector 45, both control signals BS and FS have a logic value "0" and no phase shift is effected in clock generator 12.

The magnitude of the thresholds of detector 45 is $V_r(k)$/N, where the value N to be used in detector 45 is controlled by a circuit 46 This circuit 46 controls also the number M of sample periods over which accumulator 44 averages output signal e(k−1).ĉ(k) of multiplier 43. Thereto, circuit 46 includes a counter 47 with an adjustable end position M, which counter 47 receives the local clock signal of frequency 1/T and when reaching its final position M produces a pulse whose leading edge enables detector 45 and whose whose trailing edge resets the contents of accumulator 44 to an initial value 0 after these contents have been detected in detector 45. The further structure of this circuit 46 will be described hereinafter, but first it will be explained how the timing control circuit 11 of FIG. 6 described so far operates for a given state of accumulator 44 and detector 45 which is characterized by a given pair (M,N) of the values M and N controlled by circuit 46.

At the instant where counter 47 of circuit 46 reaches its final position M, k has a specific value and for this value of k the output signal u(k) of accumulator 44 is given by the expression:

$$u(k) = (1/M) \sum_{i=0}^{M-1} e(k-1-i) \cdot c(k-i). \qquad (9)$$

This signal u(k) can be considered to be the sum of a mean value g(k) of the phase error signal proper over M sample periods and an amount of noise n(k) which is the mean value over M sample periods of the interference and noise components in signal e(k−1).ĉ(k) of multiplier 43, so that signal u(k) can be written as:

$$u(k) = g(k) + n(k). \qquad (10)$$

With the explanation of FIG. 1 it has already been assumed that the phase of the local clock signal can be shifted in phase steps of such magnitude $\Delta\phi$ that m phase steps correspond with a single period T so that $\Delta\phi$ as a fraction of T satisfies the equation (3):

$$\Delta\phi = T/m.$$

From this explanation it follows that between the magnitude $\Delta\phi$ of a single phase step and the associated magnitude $\Delta\phi$ of the change of the phase error signal, there is a relationship which in a good approximation may be considered to be linear for a neigbourhood of a phase difference zero between the local clock signal and the clock signal inherent to the received data symbols, which linear relationship in this neighbourhood of a zero phase difference can be written, on account of formulas (4)–(6), as:

$$= 2V_r(k)\Delta\phi T = 2V_r(k)/m \quad (11)$$

Now, if the phase difference between the two clock signals does not exceed a half phase step $\Delta\phi/2$ and hence the average value g(k) of the phase error signal proper is situated in an area for which it holds on account of formula (11):

$$-V_r(k)/m \leq g(k) \leq +V_r(k)/m \quad (12)$$

a phase step $\Delta\phi$ of the clock signal in forward or backward direction does not produce a further reduction of the phase difference between the two clock signals. At the output of accumulator 44, however, this mean value g(k) is not available separately, but a signal u(k) is available that is the sum of this mean value g(k) and an amount of noise n(k), compare formula (10). Now, by selecting in detector 45 the value N such that the magnitude $V_r(k)/N$ of the thresholds N satisfies:

$$V_r(k)/N = 2V_r(k)/m = \Delta\phi, \quad (13)$$

thus, by a choice of $N = m/2$, it is achieved that in clock generator 12 no phase shift by one step $\Delta\phi$ is effected for values of signal u(k) which satisfy:

$$-2V_r(k)/m < u(k) < +2V_r(k)/m. \quad (14)$$

In the case considered here, in which the mean value g(k) of the phase error signal proper satisfies formula (12), an amount of noise n(k) having a magnitude not exceeding $\Delta\phi/2 = V_r(k)/m$ can be admitted in signal u(k) without leading to a phase shift of the local clock signal by a phase step $\Delta\phi$. The phase shift as a result of this amount of noise n(k) thus has a magnitude not exceeding a half phase step $\Delta\phi/2$. As the averaging of signal $e(k-1).c(k)$ in accumulator 44 is effected over M sample periods, the value M can now be chosen such that in the case of phase convergence considered here, (that is to say, a phase difference between the two clock signals which does not exceed a half phase step $\Delta\phi/2$), the values of signal u(k) will exceed the thresholds of detector 45 having a magnitude of $2V_r(k)/m$ with a probability that is only very slight. Given the generally Gaussian nature of noise n(k), sporadically occurring transgressions of these thresholds can still be expected, however. In this connection it is advantageous that occasional peaks of signal) e(k) with exceptionally large values are limited by limiter 41 to values having a magnitude of $V_r(k)/2$, for example, so that these occasional peaks have only a limited effect on signal u(k) at the output of accumulator 44. Thus, it appears to be possible to sufficiently suppress the influence of noise n(k) to block, after phase convergence is attained, the process of shifting the phase of the local clock signal in steps having the magnitude $\Delta\phi$ for values of signal u(k) which satisfy formula (14), that is to say:

$$2V_r(k)/m < u(k) < +2V_r(k)/m \quad (15)$$

After blocking this step-by-step phase shift of the local clock signal the probability of incidental transgressions of the thresholds of detector 45 by signal u(k), and thus the probability of incidental phase steps $\Delta\phi$, can be further reduced by averaging the signal $e(k-1)\hat{c}(k)$ in accumulator 44 over a larger number of symbol intervals. This can be achieved in a simple manner by enlarging in circuit 46 the final position M of counter 47 from the original value to a value which, for example, is equal to four times this original value.

A further reduction of the probability of incidental phase steps $\Delta\phi$ after attaining phase convergence can be achieved by enlarging the magnitude $V_r(k)/N$ of the thresholds of detector 45 from the original value $2V_r(k)/m$ to a value of, for examples $8V_r(k)/m$ which is also four times as large, thus by reducing the value N from the original value $N = m/2$ to the value $N = m/8$. In this case no phase shift with a step $\Delta\phi$ is effected for values of signal u(k) which satisfy:

$$-8V_r(k)/m < u(k) < +8V_r(k)/m \quad (16)$$

The probability that signal u(k) exceeds the limits of the permissible zone according to formula (16) by occasionally large values of noise n(k) is considerably smaller than in the case of the original zone according to formula (14) which, for that matter, is four times narrower.

These measures are preferably combined, that is to say that with an enlargement of the permissible zone between the thresholds of detector 45 also the interval over which accumulator 44 averages has a greater length. How these measures can be implemented with the aid of circuit 46 in FIG. 6 by controlling the values M and N will now be explained for a practical case in which the data symbol rate 1/T has a value of 120 kBaud and the local clock signal thus has a frequency $1/T = 120$ KHz. In this case $m = 32$ appears to be a suitable practical value for the number of phase steps per period T.

In addition to counter 47, which has an adjustable final position M, circuit 46 in FIG. 6 includes a counter 48 counting the number of times counter 46 reaches this final position M. This counter 48 generates two logic signals C(15) and C(31), a logic value "1" of signal C(15) corresponding with a count value 15 and a logic value "1" of signal C(31) corresponding with a count value 31 constituting the final position of counter 48. These signals C(15) and C(31) are applied to a state control circuit 49, to which is also applied a logic signal S having a logic value "1" when the phase step $\Delta\phi$ is effected. This signal S is obtained with the aid of an OR gate 50, to which the two logic control signals BS and FS are applied produced by detector 45 when a phase step $\Delta\phi$ has to be made in forward or backward direction. In response to the logic signals S, C(15) and C(31) circuit 49 generates four control signals CE, CR, M and N for counter 48, counter 47 and detector 45, respectively. A logic value "1" of signal CE enables counter 48 and a logic value "1" of signal CR resets counter 48 to a final position of counter 47, a logic value "0" of signal M corresponding with a count value M=120 as the final position and a logic value "1" corresponding with a count value M=480 as the final position. Finally, signal N is used for adjusting the magnitude of the thresholds of detector 45, a logic value "0" of signal N corresponding with thresholds having the magnitude of $V_r(k)/N = V_r(k)/16$ and a logic value "1" corresponding with the thresholds having the magnitude of $V_r(k)/N = V_r(k)/4$.

Timing control circuit 11 of FIG. 6 can be brought into three states under the control of circuit 49, which states are characterized by the value M of the number of symbol intervals over which accumulator 44 averages and the value N which indicates the magnitude $V_r(k)/N$ of the threshold of detector 45:
-state I with M=120 and N=16,
-state II with M=480 and N=16,
-state III with M=480 and N=4.

In state I counter 47 reaches its final position after M=120 symbol intervals and the detector 45 then enabled determines whether output signal u(k) of accumulator 44 is situated inside the zone between the thresholds $-V_r(k)/16$ and $+V_r(k)/16$ or outside this zone. When the process of phase shifting of the local clock signal in steps having the magnitude $\Delta\phi$ has advanced such that phase convergence is achieved, the phase difference relative to the clock signal inherent to the received data symbols being a half phase step $\Delta\phi/2$ at the most, in state I the count value of the counter 48 will be incremented by one each time signal u(k) is situated inside the zone between the thresholds of detector 45 and thus satisfies:

$$-V_r(k)/16 < u(k) < +V_r(k)/16 \qquad (17)$$

in which case signal S has a logic value "0" because the both signals BS and FS have a logic value "0". So, circuit 49 has to be arranged such that in state I enabling signal CE and reset signal CR for counter 48 have a logic value "1" and a logic value "0" respectively, when a logic value "0" occurs for signal S. If, in state I, signal u(k) satisfies formula (17) and is thus situated inside the zone between the thresholds of detector 45 for a number of times equal to 15, it is provisionally assumed that phase convergence has taken place. Counter 48 has then reached a count value 15 and supplies a signal C(15) having a logic value "1" to circuit 49 for effecting the transition to state II, at which transition counter 48 is reset to a count value "0" as the initial position. Thus, circuit 49 has to be arranged such that at the transition from state I to state II a reset signal CR is produced for counter 48 and in state II a control signal M having a logic value "0" for adjusting counter 47 to a final position having a count value M=480.

In state II it is examined whether the assumption of phase convergence is correct. Counter (17) now reaches its final position after M=480 symbol intervals so that the averaging in accumulator 44 is effected over an interval four times larger than in state 1 and the probability of incidentically exceeding the thresholds $-V_r(k)/16$ and $V_r(k)/16$ by signal u(k) is thus reduced. Also in state II the count value of counter 48 is incremented by one each time signal u(k) satisfies formula (17) and thus is situated in the zone between the thresholds of detector 45, but different from the situation in state I, counter 48 is reset to a Zero count value as initial position as soon as formula 17) is not satisfied for one time and thus signal u(k) is for once situated outside the zone between these thresholds of detector 45. If in state II signal u(k) uninterruptedly satisfies formula (17) for 31 times, it is assumed that phase convergence has really taken place. Counter 48 has then reached the final position with a count value of 31 and applies a signal C(31) having a logic value 1 to circuit 49 for effecting the transition to state III, at which transition counter 48 retains its final position with the count value 31. Circuit 49 thus has to be arranged such that when transiting to state III no reset signal CR is produced for counter 48 and in state III a control signal M as well as a control signal N is generated having a logic value "1" to keep counter 47 adjusted to a final position having a count value M=480 and give the magnitude $V_r(k)/4$ to the thresholds of detector 45.

In state III the averaging in accumulator 44 is also effected over M=480 symbol intervals but, in addition, the zone between the thresholds of detector 45 is four times wider than in states I and II, so that the probability of signal u(k) incidentically exceeding the thresholds $-V_r(k)/4$ and $+V_r(k)/4$ is considerably smaller than in state 11. This widening of the zone between the thresholds of detector 45, after phase convergence has been confirmed in a sufficiently reliable manner, is an effective counter-measure against undesirable incidental phase steps $\Delta\phi$ of the local clock signal as a consequence of interference and noise components of phase error signal $e(k-1).\hat{c}(k)$. Then it is no longer worthwhile incrementing the count value of counter 48 by one each time signal u(k) satisfies:

$$-V_r(k)/4 < V_r(k)/4. \qquad (18)$$

However, as soon as the condition of formula (18) is not satisfied for one time in state III and thus a phase step $\Delta\phi$ of the local clock signal in forward or backward direction is effected, one cannot justifiably assume that the phase convergence of the local clock signal shifted by one phase step $\Delta\phi$ is reliable and, therefore, a transition to state I takes place to verify once again the correctness of the assumption of phase convergence. So, circuit 49 has to be arranged such that in state III enabling signal CE for counter 48 has a logic value "0" and the occurence of a logic value "1" of signal S effects an immediate return to state I, on which return also a reset signal CR with the logic value "1" is produced to reset counter 48 to a count value 0 for its initial position.

For controlling these three states I, II and III, circuit 49 can be arranged in different ways. By way of example FIG. 7 shows in detail a block diagram of an optional embodiment for the state control circuit 49 in FIG. 6.

Figure 7:
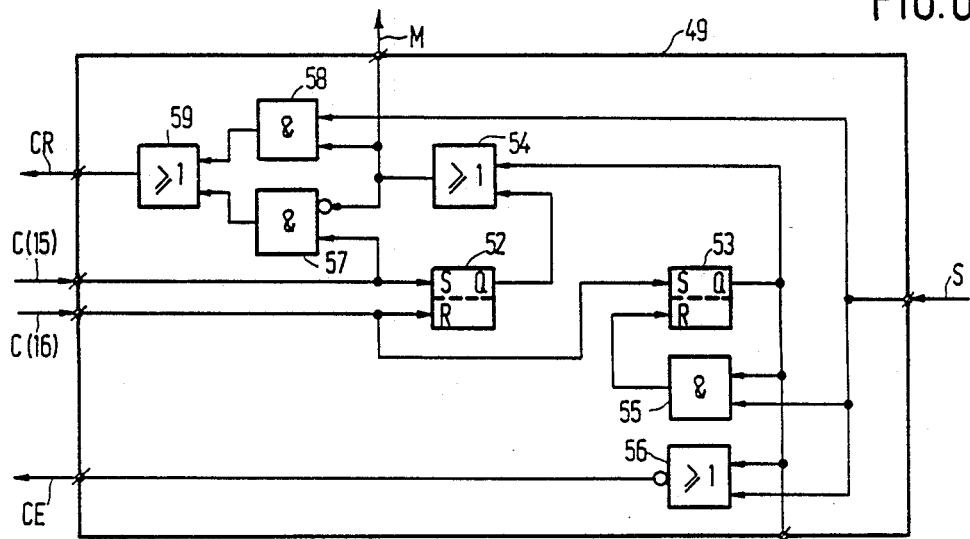
FIG. 7 shows in detail a block diagram of an optional embodiment of a state control circuit in the timing control circuit of FIG. 6.

For characterizing the three states I, II and III, circuit 47 in FIG. 7 comprises two RS flip flops 52 and 53, the following relationship existing between these states and the logic values of the signals Q(52) and Q(53) at the Q-outputs of the RS flip flops 52 and 53:

| state I | Q(52) = "0" | Q(53) = "0" |
| --- | --- | --- |
| state II | Q(52) = "1" | Q(53) = "0" |
| state III | Q(52) = "0" | Q(53) = "1" |

The above relationship shows that, in all states, control signal M for counter 47 of FIG. 6 can be easily obtained from signals Q(52) and Q(53) by means of an OR-gate 54 and further that signal Q(53) can be used directly as control signal N for detector 45 of FIG. 6

The transition from state I to state II is effected by applying signal C(15) from counter 48 in FIG. 6 to the S input of flipflop 52, the transition from state II to state III is effected by applying signal C(31] from counter 48 in FIG. 6 to both the R-input of flipflop 52 and the S-input of flipflop 53, and finally the transition from state III to state I is effected by applying signal S from OR-gate 50 in FIG. 6 to an AND-gate 55 which is kept open by signal Q(53) only in state III and applying the output signal from AND-gate 55 to the R-input of flip-flop 53.

The enabling signal CE for counter 48 of FIG. 6 only required in states I and II is obtained from signals Q(53) and S by means of a NOR-gate 56. By means of an OR-gate 57, which is only kept open in state I by control signal M, an AND-gate 58 which is only kept open in states II and III by control signal M, and an OR-gate 59 connected to the outputs of AND gates 57, 58, reset signal CR for counter 48 of FIG. 6 is obtained by applying signal C(15) from counter 48 in FIG. 6 to AND-gate 57 (for generating signal CR when transiting from state I to state II) and applying signal S from OR-gate 50 in FIG. 6 to AND-gate 58 (for generating signal CR in the states II and III).

Figure 8:
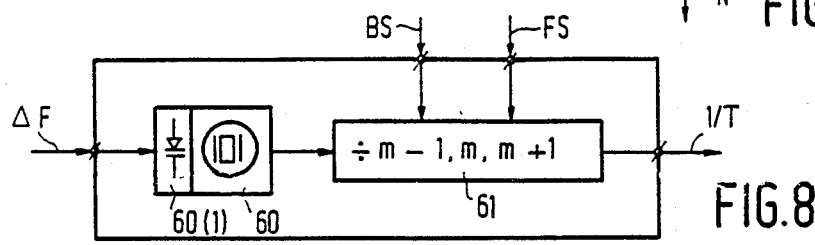
FIG. 8: shows a block diagram of a local baud-rate clock generator in the receiver of FIG. 2.

After the description of the example in FIG. 7, it will be evident that a great variety of implementations of state control circuit 49 in FIG. 6 is feasible. A possibility which is attractive for practical purposes is utilizing a table-lookup memory for the implementation of circuit 49, in which memory the values of the signals M, N, CE and CR are stored at memory locations whose addresses are formed by the values of the signals S, C(15). C(31) and the stored values of the sigmas M and N. The way in which such a table-lookup memory is arranged, is widely known and does not need any further explanation in this context FIG. 8 shows a block diagram of generator 12 in FIG. 2 for generating the local clock signal having frequency 1/T, whose phase can be controlled in steps having the magnitude $\Delta\phi = T/m$ according to formula (3) in a direction which is determined by control signals BS and FS originating from detector 45 in timing control circuit 11 of FIG. 6 Generator 12 in FIG. 8 comprises a crystal oscillator 60 and connected thereto a frequency divider 61 from which the local clock signal is derived. The frequency of oscillator 60 is larger than the nominal value of the clock rate 1/T by a factor m and the dividing factor of the divider 61 normally also has a value m. For effecting a phase step $\Delta\phi = T/m$ in backward direction (to the left in the time diagrams of FIG. 1), the dividing factor of divider 61 is adjusted to a value (m−1) by a control signal BS for the duration of one dividing cycle and, subsequently, readjusted to its nominal value m. In this case the dividing cycle concerned does not have the normal interval T but an interval of (1−1/m)T so that the clock signal at the output of divider 61 after this dividing cycle has ended has actually made a step T/m in backward direction. In a similar manner a phase step $\Delta = T/m$ in forward direction is effected by adjusting the dividing factor of divider 61 to a value (m+1) under the control of control signal FS for the duration of a single dividing cycle.

If the frequency of the local clock generator 12 in FIG. 2 shows a slight deviation relative to the clock frequency in the transmitter of FIG. 2, the timing control circuit 11 can also be used for controlling the frequency of clock generator 12. For this purpose timing control circuit 11 of FIG. 6 comprises a polarity detector 62 to which is applied the phase error signal $e(k-1)$ $.\hat{c}(k)$ of multiplier 43 for generating a binary control signal AF having a fixed positive value when signal $e(k-1)\hat{c}(k)$ is positive and a fixed negative value (of the same magnitude) when signal $e(k-1).\hat{c}(k)$ is negative. This control signal AF is applied to a frequency control circuit 60(1) of crystal oscillator 60 in FIG. 8 for increasing or decreasing the frequency by an amount which is only a tiny fraction of the nominal value of this frequency (for example, a fraction in the order of from $10^4$ to $1:10^5$ in the case under consideration of a nominal frequency 1/T=120 KHz and a dividing factor m=32 of divider 61). This change of rate is attended with a slight phase shift per period T of the local clock signal, so that only a general tendency of control signal AF in a positive or negative direction over a very large number of periods, as a consequence of a frequency difference between t transmitter and receiver in FIG. 2, reads to a significant phase shift of the local clock signal for reducing this frequency difference, but frequently occurring errors in control signal AF as a consequence of interference and noise components of phase error signal $e(k-1).c(k)$ substantially have no influence because the mean value over this large number of periods is practically equal to zero.

In the description of FIG. 2 presented above, a phase error signal having the form $e(k-1).\hat{cl}$) has always been used, the error signal $e(k)$ being derived in updating circuit 9 from signal $s(k)$ at the input of symbol detector 7 in accordance with formula (7) with the aid of an adaptive reference signal $V_r(k)$ that is generated in reference circuit 10 in accordance with formula )8). The information about the phase shift to be effected can also be derived from input signal s(k) of symbol detector 7 in a different way, in which it is not always necessary to use updating circuit 9 and reference circuit 10. True enough, it is always assumed that precursive and postcursive intersymbol interference in this input signal s(k) is substantially completely cancelled by sampling and conditioning means 6. A simple possibility for deriving a phase error signal utilizes this signal s(k) itself when specific symbol transitions occur. For example, if a transition from the value 0 to the value +1 in signal s(k) is detected by the occurrence of the values $\hat{c}(k-1)=0$, $\hat{c}(k)=+1$ at the output of symbol detector 7, signal $s(k-1)$ can be applied directly to accumulator 44 as a phase error signal In this case multiplier 43 in FIG. 6 has to be exchanged for a switch which is only closed for the combination $\hat{c}(k-1)=0$, $\hat{c}(k)=+1$ and signal s(k) has to be applied to limiter 41 in lieu of signal e(k). In a similar way signal $-s(k-1)$ can be used if a transition from the value 0 to the value $-1$ is detected by the occurrence of the values $\hat{c}(k-1)=0$, $\hat{c}(k)=-1$ at the output of symbol detector 7.

Within the scope of the present invention it is especially important, however, that the recovered phase error signal be representative of a phase difference between the local clock signal and the clock signal inherent to the received data symbols. The way in which such a phase error signal is derived from the conditioned received data symbols plays a less important role therein and the choice between the various options is made on the basis of the effectiveness of the representation of the phase difference between the two clock signals and by the simplicity of the practical implementation. In this respect the extensively discussed method of deriving a phase error signal having the form $e(k-1)\cdot\hat{c}(k)$ is particularly attractive, the more so because this method can also be used for other types of data symbols than the type discussed here of ternary data sybols according to a standardized bipolar line code.

What is claimed is:

1. A receiver of a system for transmitting data symbols at a given baud-rate 1/T, this receiver comprising a symbol detector operating at the baud-rate 1/T; means for optimally conditioning the received data symbols for symbol detection; means for deriving from a conditioned symbol an error signal which is representative of a phase difference between a baud-rate clock signal associated with the received data symbols and a locally generated baud-rate clock signal for the symbol detector; and phase control means for reducing this phase difference in a step-by-step fashion in response to the error signal, characterized in that the receiver comprises means for establishing whether the mean value of the error signal, over a predetermined number of symbol intervals, is situated in a zone whose boundaries are determined by a first given fraction of the conditioned symbol value at the symbol detection instant, and means for blocking the phase control means if the mean value of the error signal is situated in said zone, and also for unblocking the phase control means if the mean value of the error signal in the blocked state meets a predetermined criterion.

2. A receiver as claimed in claim 1, characterized in that means are provided for averaging the error signal over a larger number of symbol intervals when the phase control means are blocked.

3. A receiver as claimed in claim 1, characterized in that means are provided for determining, when the phase control means are blocked, the boundaries of said zone in accordance with a second given fraction of the level of the conditioned signal at the symbol detection instant, this second fraction exceeding said first fraction, whereby an enlarged zone for permissible mean error signal values is attained.

4. A receiver as claimed in one of the claims 1-3, characterized in that means are provided for limiting the peak values of the error signal.

5. A receiver as claimed in claim 2, characterized in that means are provided for determining, when the phase control means are blocked, the boundaries of the said zone in accordance with a second given fraction of the level of the conditioned signal at the symbol detection instant, this second fraction exceeding said first fraction, whereby an enlarged zone for permissible mean error signal values is attained.

6. A receiver as claimed in claims 1,2,3, or 5, further characterized in that counting means are provided for counting how many times the average error signal is situated in said zone or said enlarged zone.

7. A receiver as claimed in claim 6, characterized in that the counting means are reset as soon as the man of the error signal is for once not situated in said enlarged zone.

8. A receiver as claimed in claim 7, characterized in that the boundaries of said zone are transferred to the boundaries of said enlarged zone when the counting means have reached a predetermined counting value.

9. A receiver as claimed in claim 3, characterized in that the mean of the error signal meets the predetermined criterion when said mean of the error signal is situated outside the enlarged zone.

10. A receiver as claimed in claim 1, characterized in that the mean of the error signal meets the predetermined criterion when said mean of the error signal is situated outside said zone.

* * * * *